United States Patent
Hoffmann

(10) Patent No.: US 12,485,819 B2
(45) Date of Patent: Dec. 2, 2025

(54) CAMERA-MONITOR SYSTEM FOR A VEHICLE, AND METHOD FOR CONTROLLING SUCH A CAMERA-MONITOR SYSTEM

(71) Applicant: Bayerische Motoren Werke Aktiengesellschaft, Munich (DE)

(72) Inventor: Philipp Hoffmann, Hannover (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 18/845,933

(22) PCT Filed: May 25, 2023

(86) PCT No.: PCT/EP2023/064064
§ 371 (c)(1),
(2) Date: Sep. 11, 2024

(87) PCT Pub. No.: WO2023/237345
PCT Pub. Date: Dec. 14, 2023

(65) Prior Publication Data
US 2025/0187544 A1    Jun. 12, 2025

(30) Foreign Application Priority Data

Jun. 7, 2022 (DE) .................... 10 2022 114 245.0

(51) Int. Cl.
*H04N 7/18* (2006.01)
*B60K 35/22* (2024.01)
(Continued)

(52) U.S. Cl.
CPC ................. *B60R 1/26* (2022.01); *B60K 35/22* (2024.01); *B60K 35/28* (2024.01); *B60K 35/60* (2024.01);
(Continued)

(58) Field of Classification Search
CPC ........ H04N 7/18; B60R 1/26; B60R 2300/20; B60R 2300/30; B60K 35/60; B60K 35/28; B60K 35/22; G02B 27/0101
(Continued)

(56) References Cited

U.S. PATENT DOCUMENTS 7,275,831 B2 * 10/2007 Knoll ................. G02B 27/0101
                                                    348/115
11,508,078 B2 * 11/2022 Eckman ................ G01S 17/931
(Continued)

FOREIGN PATENT DOCUMENTS

DE    10 2021 004 637 A1    11/2021
DE    10 2020 120 626 A1    2/2022

OTHER PUBLICATIONS

International Search Report (PCT/ISA/210) issued in PCT Application No. PCT/EP2023/064064 dated Sep. 12, 2023 with English translation (5 pages).
(Continued)

*Primary Examiner* — Trang U Tran
(74) *Attorney, Agent, or Firm* — Crowell & Moring LLP

(57) ABSTRACT

The present disclosure relates to a display system for a vehicle, comprising: a camera with a specified scanning region for scanning a first image of the surroundings of the vehicle; a processing device for providing a second image on the basis of the first image; a graphical display for displaying the second image; and an optical element for inserting the display into the scanning region of the camera such that a section of the first image comprises the second image. The processing device is designed to provide the second image on the basis of the insertion process.

11 Claims, 5 Drawing Sheets

(51) Int. Cl.
*B60K 35/28* (2024.01)
*B60K 35/60* (2024.01)
*B60R 1/26* (2022.01)
*G02B 27/01* (2006.01)

(52) U.S. Cl.
CPC ............ *H04N 7/18* (2013.01); *B60R 2300/20* (2013.01); *B60R 2300/30* (2013.01); *G02B 27/0101* (2013.01)

(58) Field of Classification Search
USPC ........................................................ 348/148
See application file for complete search history.

(56) References Cited

U.S. PATENT DOCUMENTS

| | | | |
|---|---|---|---|
| 12,066,627 B2* | 8/2024 | Huang | G02B 27/0149 |
| 2015/0260987 A1* | 9/2015 | Weingarten | G02B 27/0101 |
| | | | 348/115 |
| 2018/0093625 A1* | 4/2018 | Shintani | B60K 35/28 |
| 2018/0131877 A1 | 5/2018 | Amano et al. | |
| 2020/0218068 A1* | 7/2020 | Takahashi | G02B 27/0101 |

OTHER PUBLICATIONS

German-language Written Opinion (PCT/ISA/237) issued in PCT Application No. PCT/EP2023/064064 dated Sep. 12, 2023 with English translation (7 pages).
German-language Search Report issued in German Application No. 10 2022 114 245.0 dated Sep. 5, 2022 with partial English translation (10 pages).

\* cited by examiner

CAMERA-MONITOR SYSTEM FOR A VEHICLE, AND METHOD FOR CONTROLLING SUCH A CAMERA-MONITOR SYSTEM

BACKGROUND AND SUMMARY

The present disclosure relates to a camera-monitor system for a vehicle. In particular, the present disclosure relates to the control of a camera-monitor system.

A motor vehicle comprises an exterior mirror in order to convey to the driver an impression of traffic events located behind him. The exterior mirror can be replaced by a camera-monitor system (CMS), which comprises a camera attached to the motor vehicle and a graphic display in the interior. The camera is typically attached approximately at a point on the motor vehicle at which the exterior mirror is otherwise located and scans an area located laterally behind the driver. An image provided by the camera can be displayed on the display, so that the driver recognizes an image on the display which behaves essentially like that of an exterior mirror.

A driver assistance system for assisting a reverse drive of a vehicle having a trailer and a correspondingly equipped vehicle are known from DE 10 2021 004 637 A1, which has a reversing camera and a projection device arranged on the reversing camera.

One advantage of a CMS is the possibility of adapting the display to prevailing light conditions. For example, in a nighttime environment, a contrast of the displayed image can be increased and a brightness can be decreased. If the sun shines directly into the camera, the contrast and the brightness can thus be decreased to match. In a very bright environment, the contrast and the brightness can be increased. The driver can thus better recognize the area located behind him.

However, the change of the representation can also have the result that the driver can no longer recognize details on the image displayed to him well. In particular in the event of a sudden change of surrounding light conditions, for example, when driving into or out of a tunnel, the control of the display can be difficult.

It has been proposed that the image provided by means of the display be scanned by means of a further camera and the provision of the displayed image be controlled on the basis of the scan. However, a further camera is required for this purpose, which has to be attached in the interior of the motor vehicle. Substantial costs can be connected thereto. In addition, a new error in the provision of the image for the driver can be introduced by a scanning error of the further camera.

One object underlying the invention is to specify an improved technology for controlling a camera-monitor system for a vehicle. The invention achieves the object by means of the subjects of the independent claims. Dependent claims reflect further embodiments and implementations.

According to a first aspect, a display system for a vehicle comprises a camera having a predetermined scanning area for scanning a first image from an environment of the vehicle; a processing unit for providing a second image on the basis of the first image; and a graphic display for displaying the second image. In addition, an optical element for inserting the display into the scanning area of the camera is provided, so that a section of the first image comprises the second image. The processing unit is configured to provide the second image as a function of the insertion.

It has been recognized that the second image, which is provided to a driver of the vehicle, can be inserted solely optically into the scanning area of the camera by means of the optical element, so that the camera additionally carries out a scan of the second image on the display. In this case, the insertion preferably only occupies a small part of the image area of the second image, so that an area that can be displayed or a resolution of the second image is reduced only little or not at all.

A further camera for scanning the display or the second image can be omitted, so that the display system can be constructed more simply or can manage in an improved manner without using a system-external component, such as an interior camera. The optical element is preferably reflective and can in particular comprise a mirror, a prism, or a similar element. Optionally, multiple optical elements can also be used, which can optionally be attached to one another or connected to one another.

The processing unit is preferably configured to provide the second image in such a way that the insertion in the first image has a predetermined brightness and/or a predetermined contrast. The predetermined brightness or the predetermined contrast can be determined as a function of prevailing light conditions in the environment of the vehicle. The light conditions can be determined by means of a corresponding sensor or on the basis of the first image. The brightness and/or the contrast can be increased above a normal value or lowered below it in different predetermined light conditions. The normal value can be specified by a user of the CMS.

The scanning area is preferably directed to the rear from the camera; wherein the optical element is located on the vehicle behind the camera and behind the second image. Direction specifications used herein are oriented, if not indicated otherwise, to a typical direction of travel of the vehicle forward along its longitudinal axis.

The optical element can deflect a beam path between the display and the camera, for which purpose it preferably comprises at least one reflective element such as a mirror or a prism. A deflection can generally be effected at an interface between media having different optical densities, wherein a shape and alignment of the interface determines the type of the deflection. The optical element can simultaneously have a refractive effect, for example, in order to shrink or enlarge the second image inserted into the camera. In a further embodiment, the optical element can also carry out a predetermined distortion, for example, a trapezoid or pincushion distortion. The interface can be curved in a matching manner for this purpose. A distortion already present on the display due to a perspective of the optical element can thus be partially or completely compensated for.

The vehicle can have a transparent pane and the optical element can be attached to the pane. In one embodiment, an existing pane can be supplemented with an optical element attached on the inside or outside. The optical element can be cemented or adhesively bonded with the pane or produced integrated with the pane. In a further embodiment, a section of the pane can be equipped with a material having a different optical density. A thickness of the pane can thus be unchanged, but the desired reflective effect can occur at the point of the optical material. The optical element can be made small and inconspicuous.

The pane can delimit an interior of the vehicle, in which a person on board is located, from an exterior and in particular can comprise a windshield or side window. The camera is typically attached in the area of a front wheel, a front fender, an A-pillar, or a front door of the vehicle, wherein the vehicle can in particular comprise a passenger vehicle or a truck. If a possible line of sight exists between the camera and the side window, the optical element can be inserted therein. Of course, another pane which delimits the interior of the vehicle from the exterior can also be used for the attachment of the optical element.

If the windshield can be seen from the camera, the windshield is thus also suitable for the attachment of the optical element. If the windshield is used, for example, to display the image provided by the display or reflect it in the direction of the head area, the optical element can thus decouple the second image in a bounded area in the windshield and guide it in the direction of the camera. The optical element is preferably also small and can be inconspicuous to a person on board the vehicle. It generally has a significantly smaller visible area than a direct graphic display in this case. The optical element typically has an area which is comparable to a light entry area of the camera.

The vehicle can comprise a driver station, so that a head of a driver on the driver station is in a predetermined head area. The display can be configured to provide the second image in the area of a connecting line between the head area and the camera. A display error between the perceived second image and the actual origin of the second image can thus be minimized. Especially during hazardous or precise maneuvers, for example when driving on a freeway or when parking in the area of an obstacle, this arrangement can contribute to giving the driver a realistic impression of the area located laterally behind him.

The camera is located in the exterior, while the display is preferably attached in the interior. In some embodiments, the display is configured to provide the second image as a virtual image, so that it can be perceived by the driver at a different point than that at which the display is located. For example, the display can comprise a head-up display which can project the second image by means of an inclined pane in the direction of the driver. The second image can appear to be located outside the vehicle to the driver, although the display is preferably located in the interior.

A further optical element for inserting the first optical element into the scanning area can be attached to the camera. The further optical element can be arranged in the area of an opening of the camera for the entry of light. The optical element can also be embodied as small here, so that it may not be subjected in a particular manner to an environmental influence in the outside area of the vehicle, such as wind, rain, or dust. The optical element can be attached on or behind a protective pane which is attached to a light entry area of the camera in order to protect the optics of the camera from mechanical environmental influences such as water or dust.

In one embodiment, the optical element is located behind the connecting line between the camera and the head area of the driver. This can be advantageous in particular if the optical element is attached laterally to the driver, for example, in a side window of the vehicle. The optical element can be located behind the head area, so that a direct view of the driver through the side window is not disturbed by the optical element. If the optical element is located in the windshield, a further optical element can be provided in order to throw the second image in the direction of the optical element. The second image can be reflected at two or more optical elements before it is incident in the camera.

The display can be configured to project the second image. The second image can be recognizable here to the driver as a virtual image. A further optical element for decoupling the second image can be attached in the beam path of the display. Multiple optical elements can also be combined with one another in order to insert the second image into the scanning area of the camera. The optical elements are preferably each configured here for deflecting the beam path and can optionally also fulfill a further optical function, such as focusing, distorting, shrinking, magnifying, polarizing, filtering, or coloring the light passing through.

According to a further aspect, a vehicle comprises a display system described herein. The vehicle preferably comprises a motor vehicle and can comprise, for example, a motorcycle, a passenger vehicle, or a bus. In the case of a motorcycle, no interior may be present, in this case the camera, the optical element, and the display can be attached in the exterior.

According to still a further aspect, a method for controlling a display system described herein comprises steps of providing a first image by means of the camera; determining a monitoring section in the first image which represents the second image; and providing the second image as a function of the monitoring section.

The method can preferably be carried out by means of a processing unit described herein. For this purpose, the processing unit is preferably embodied as electronic and can comprise a programmable microcomputer or microcontroller or an integrated circuit. The method can be provided in the form of a computer program product having program code means. The computer program product can also be stored on a computer-readable data carrier. Features or advantages of the method can be transferred to the device or vice versa.

It is particularly preferred for the second image to be divided disjointedly into the monitoring section and a display section; wherein the second image is furthermore preferably only provided on the basis of the display section. In contrast, the second image is preferably not based on the monitoring section. Optionally, the first image can also comprise one or more further sections, which are not even further evaluated or forwarded. For example, the location of the display section can be set in the first image in such a way that a predetermined scanning area is acquired. A surrounding section—except for the monitoring section—can be neglected.

In other words, the second image is preferably only provided on the basis of a part of the first image. The provision takes place here on the basis of a section of the first image which is not incorporated into the second image. It is thus possible to prevent a section being recognizable on the second image which represents a different content than is taken from the scanning area of the camera. In this way, the driver cannot be confused or distracted and he can readily use the second image displayed to him for the control of the vehicle.

The camera, the display, and the processing unit can together form a closed control loop. It is preferred for a time delay between a change of the second image and a change of the monitoring section to be taken into consideration in the control of the provision of the second image. A first delay can be taken into consideration, which is to be positioned between the change of the control and the output of a changed second image. A second delay, which is between the provision of a changed environment and the provision of a correspondingly changed first image, can also be taken into consideration.

BRIEF SUMMARY OF THE DRAWINGS

The invention will now be described in more detail with reference to the appended drawings, in the figures of which.

DETAILED DESCRIPTION OF THE DRAWINGS

Figure 1:
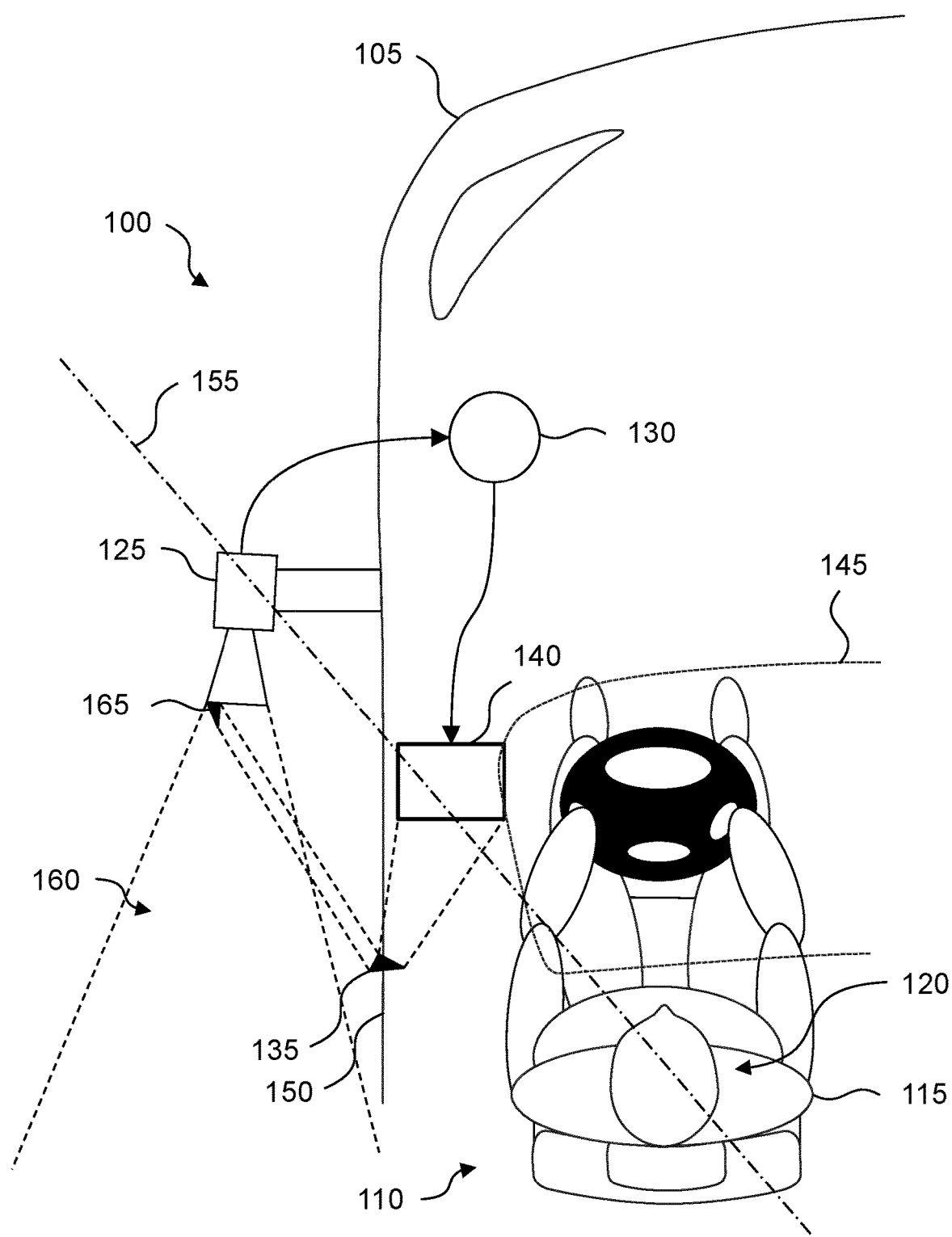
FIG. 1 illustrates one form of a display system in a first embodiment.

FIG. 1 shows a display system 100 on a vehicle 105 in a first exemplary embodiment. The vehicle 105 comprises a driver station 110, which is shown on the left in the direction of travel on the vehicle 105 by way of example. A driver 115 located on the driver station 110 has his head essentially in a predetermined head area 120.

The display system 100 comprises a camera 125, a processing unit 130, an optical element 135, and a graphic display 140. The camera 125 is attached to an outer side of the vehicle 105, in some implementations at a point at which an exterior mirror is typically attached. However, it is not necessary for there to be a line of sight connection between the head area 120 and the camera 125. The camera is usually behind an axle of a front wheel and in front of the head area 120 in the longitudinal direction. In the vertical direction, the camera 125 is preferably located below an upper edge and optionally also below a lower edge of a windshield 145 or a side window 150, which can each separate an interior of the vehicle 105 from the exterior.

In the illustration of FIG. 1, the camera 125 is shown larger and farther away laterally from the vehicle 105 than would be the case on a real vehicle 105 for better explanation of the presented technology. Solely by way of example, the camera 125 is located on the left side of the vehicle 105. It is to be noted that the technology described herein neither presumes a specific position of the driver station 110 in the vehicle 105 nor does it start from a predetermined side on which the camera 125 is attached to the vehicle 105. In particular, the presented technology can be attached on both sides of the vehicle 105 in order to enable a rear view on both sides for the driver 115.

The processing unit 130 is typically designed as a controller or control device and usually comprises a programmable microcomputer. The processing unit 130 is configured here to control the display 140 on the basis of an image provided by the camera 125 to provide an image to the driver 115.

The display 140 of FIG. 1 is embodied by way of example as a display screen, which can display an image recognizable to the driver 115 on its surface. As is described in more detail herein, the position of the display 140 is less important for the observed geometrical relationships than the position of the image which is provided thereby and is recognizable to the driver 115. For the display 140 embodied as a display screen, its position coincides with that of the image displayed thereby.

The display 140 is preferably located on a connecting line 155 between the camera 125 and the head area 120. Ideally, the connecting line 155 extends through a center point of the image plane of the camera 125, a center point of the display surface of the display 140, or an eye or an optical center point of the perception of the driver 115. A certain deviation of the position of the display 140 or of the image displayed thereby from the connecting line 155 can be tolerated, however.

It is proposed that the optical element 135 be positioned so that it throws at least a part of the image provided by the display 140 for the driver 115 into a part of the acquisition area 160 of the camera 125, so that it is acquired by the camera 125. If the display 140 is located in the interior of the vehicle 105 and the camera 115 is located outside the interior, for this purpose, the beam path has to pass a boundary of the interior. In the illustrated embodiment, this takes place at the side window 150. The optical element 135 can be arranged in the interior or outside, but it is preferably attached in the area of the passage.

It is particularly preferred for the optical element 135 to be embodied as integrated with a transparent element in the area of the boundary, the side window 150 here. For this purpose, the optical element 135 can be incorporated into the side window 150. Optionally, the optical element 135 can also partially protrude beyond a boundary of the side window 150 on the inside and/or outside. In a further embodiment, the optical element 135 is placed on the inside or outside on the side window 150. The optical element 135 preferably comprises a mirror or a prism, in particular a reversing prism such as an Amici prism, a Porro prism, or a Dove prism. A spherical element such as an optical lens or a curved reflection surface can also be comprised. The optical element 135 can also comprise multiple reflective or refractive surfaces.

In the illustration of FIG. 1, the optical element 135 is not located in the scanning area 160, so that light from the optical element 135 can reach the camera 125, but cannot be acquired thereby. In such a constellation, the scanning area 160 can be pivoted in the direction of the vehicle 105 until the optical element 135 is located in the scanning area 160. At the same time, a focal length of the camera 125 can be shortened, wherein an aperture angle of the scanning area is enlarged.

Alternatively, a further optical element 165 can be used to couple light from the first optical element 135 into the camera 125. The further optical element 165 is preferably attached to the camera 125 and can also comprise a reflective or a refractive element. In one embodiment, the camera 125 comprises an optical lens or an objective which comprises the further optical element 165.

Figure 2:
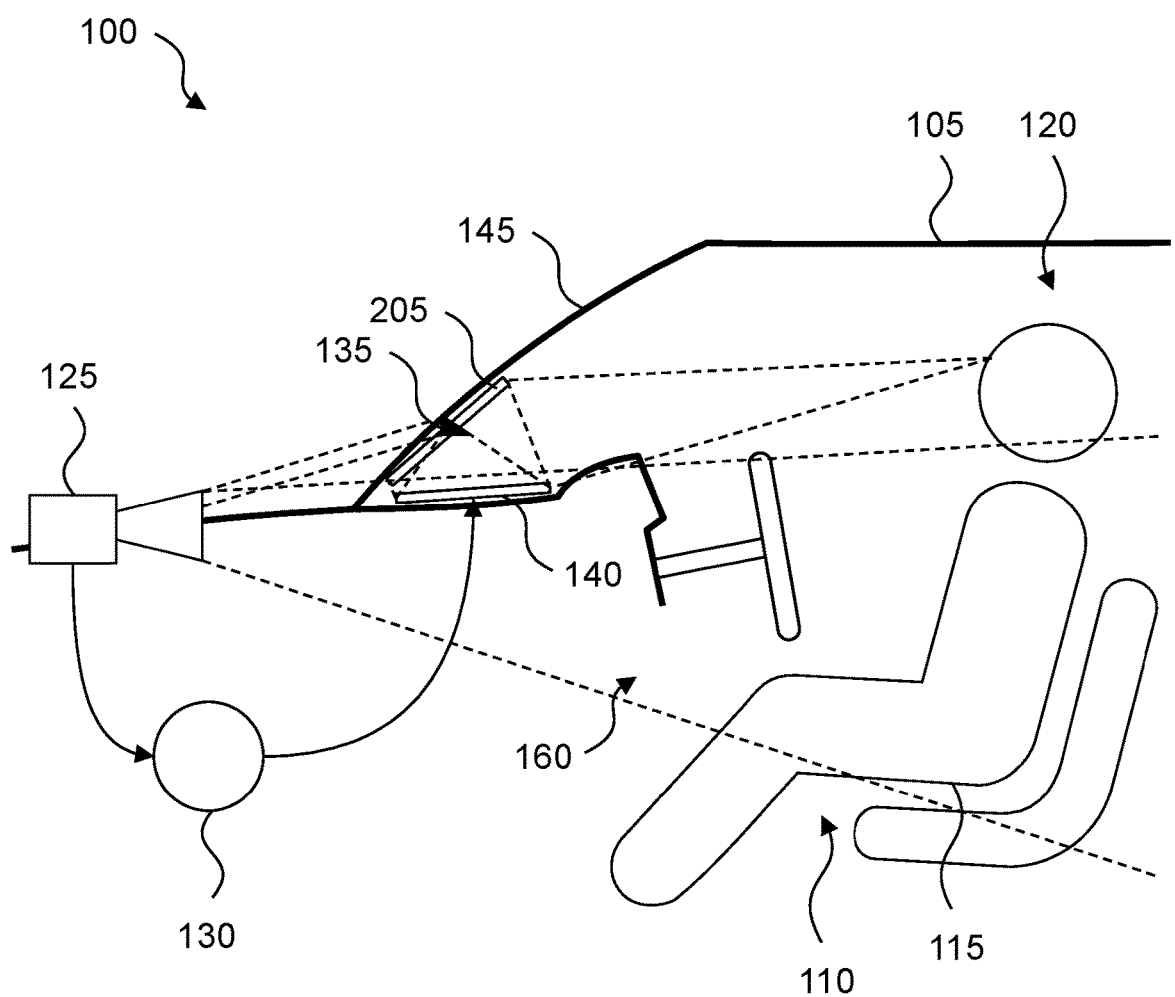
FIG. 2 illustrates one form of a display system in a second embodiment.

FIG. 2 shows a display system 100 in a second exemplary embodiment. In a similar manner as in the embodiment shown in FIG. 1, at least a part of the image provided to the driver 115 by means of the display 140 is at least partially deflected into the camera 125 by means of an optical element 135. The camera 125 is located higher on the vehicle 105 here, however, so that the light of the image can be guided through the windshield 145.

If a display 140 like a display screen is used, the optical element 135 could be placed like a mirror, for example, in the area of the driver station 110. In the embodiment of FIG. 2, however, the display 140 projects the image for the driver 115 on a pane 205, which deflects the projected image in the direction of the head area 120, so that the driver 115 can perceive the image at a predetermined distance on an axis which extends from his head through the pane 205. The pane 205 can be embodied separately or can coincide with the windshield 145. Light of the display 140 can be decoupled before or after the reflection at the pane 205 by means of the optical element 135 and can be guided in the direction of the camera 125. The optical element 135 can be embodied combined with the pane 205 or the windshield 145, wherein the options mentioned above with respect to the side window 150 can be applied.

Figure 3:
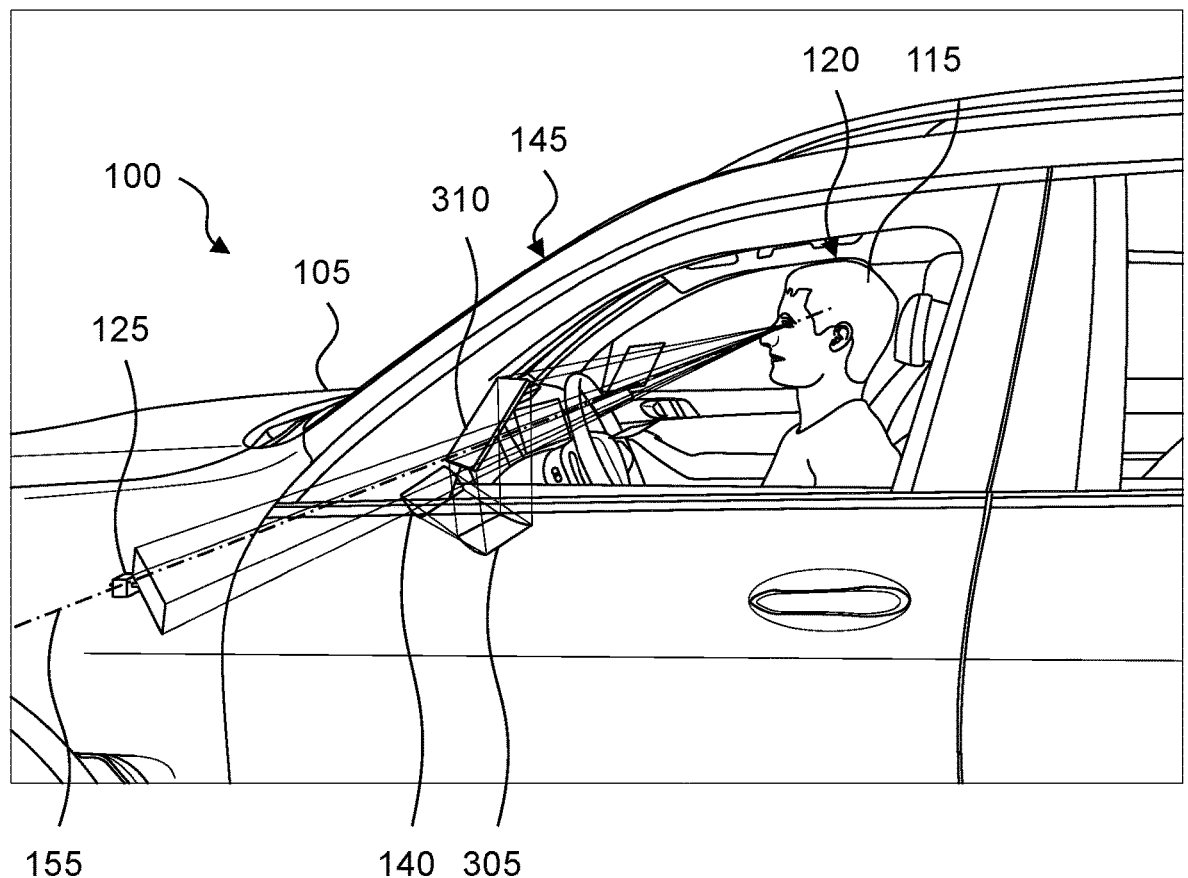
FIG. 3 illustrates one form of a display system in a third embodiment.

FIG. 3 shows a display system 100 in a third exemplary embodiment. An image of the display 140 is reflected here at a mirror 305 on a projection surface 310, where the driver 115 can perceive it. The projection surface 310 is only insignificantly offset from the connecting line 155 here, so that the image perceptible by the driver 115 can have practically the same perspective as an image provided by the camera 125, which is symbolically indicated at the camera 125.

It is to be noted that features and embodiments of elements of the vehicle 105 or the display system 100 which are described with reference to FIGS. 1 to 3 can be transferred among one another.

Figure 4:
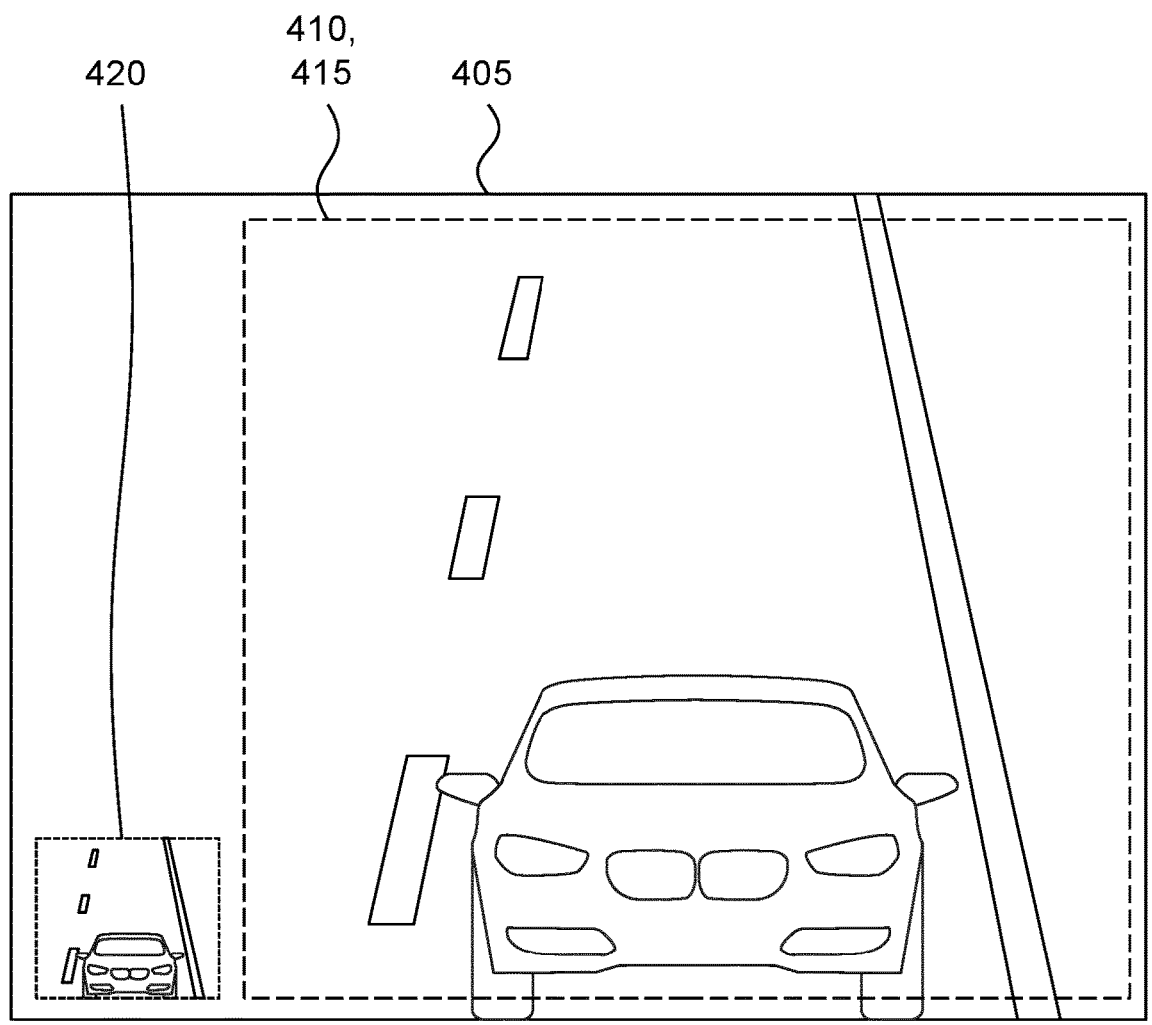
FIG. 4 illustrates a representation of a first and a second image.

FIG. 4 shows an exemplary illustration of a first image 405 and of a second image 410. The first image 405 is scanned by the camera 125 from an environment of the vehicle 105 and shows a content of the scanning area 160. A display section 415 and a monitoring section 420 are defined in the first image 405.

In this case, the sections 415 and 420 are preferably free of overlap or are disjointed. There is no section of the first image 405 which is located both in the display section 415 and in the monitoring section 420. The monitoring section 420 is typically smaller than the display section 415 and can comprise only a few picture elements (pixels). For example, the monitoring section 420 can comprise an arrangement of approximately 3×3 pixels or 4×4 pixels. In the illustration of FIG. 4, the monitoring section 420 is shown larger for purposes of explanation.

The second image 410 is based on the display section 415. In particular, the second image 410 can display a content of the display section 415, however, the second image 410 can be adapted, for example, with respect to a brightness, contrast, and/or its colors.

The monitoring section 420 comprises that part of the first image 405 in which the second image 410 provided by means of the display 140 is deflected into the scanning area 160 by means of the optical element 135. The content of the monitoring section 420 can be analyzed in order to determine a display parameter such as a brightness and/or a contrast of the second image 410 perceptible by the driver 115. The representation of the second image 410 on the display 140 by the processing unit 130 can be adapted depending on this determination. For example, if it is established that the second image 410 is excessively dark in the monitoring section 420, the display 140 can be controlled to output the second image 410 brighter.

If the display section 415 and the monitoring section 420 are not disjointed in the first image 405, an "endless tunnel" can result in the second image 410 at the point at which the monitoring section 420 is located, which results as a cascade of interleaved images of the second image 410 that become smaller and smaller. In this case, the determination of the display parameter with respect to the monitoring section 420 can neglect a section in which the tunnel is located.

Figure 5:
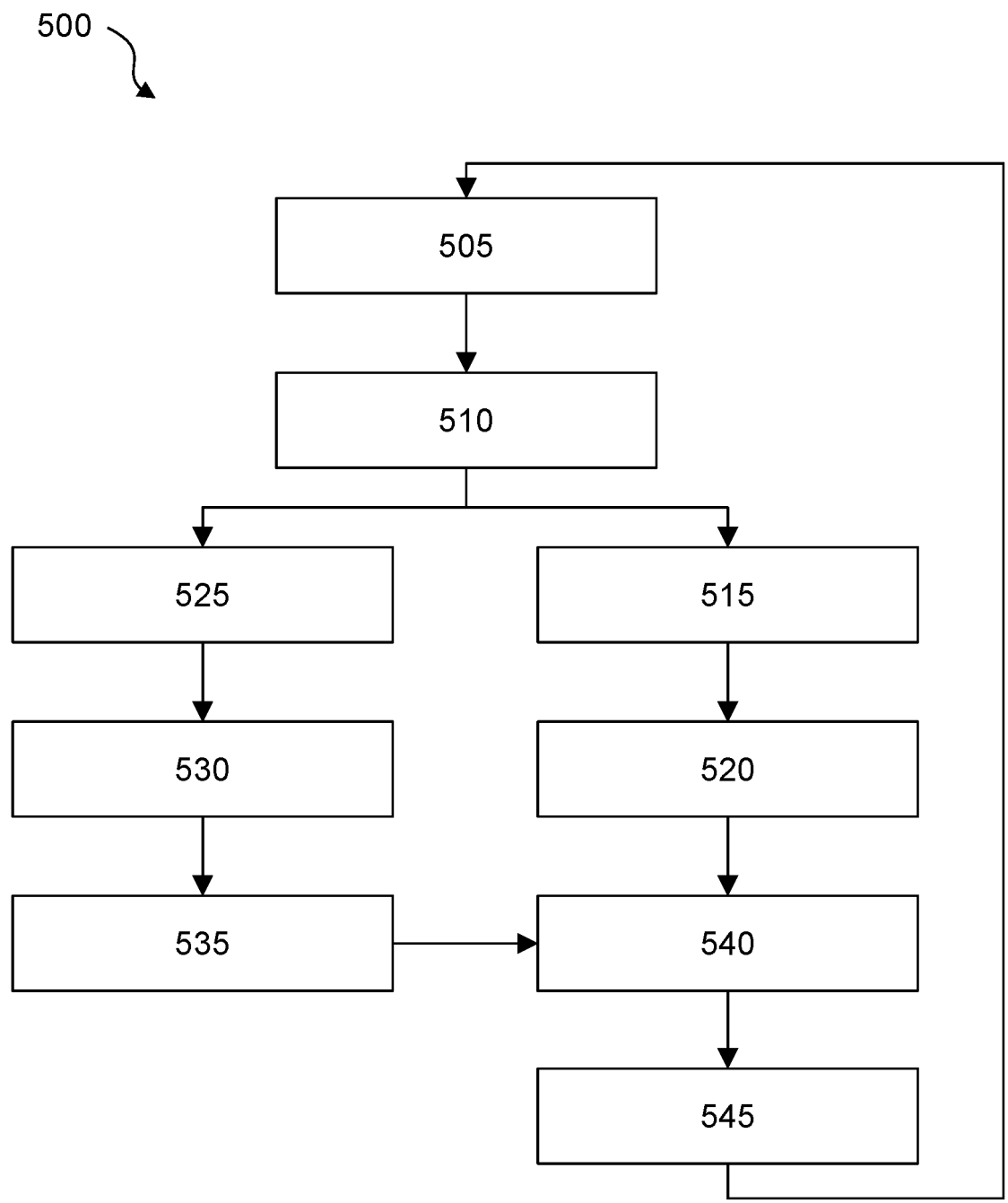
FIG. 5 illustrates a flowchart of one form of a method.

FIG. 5 shows a flow chart of a method 500 for controlling a display system 100. In a step 505, an environment of the vehicle 105 is scanned in the scanning area 160 by means of the camera 125. In a step 510, a first image 405 is provided, in which the display section 410 is determined in a step 515. The display section 410 typically has a predetermined location and size in the first image 405 as long as the alignment and focal length of the camera 125 do not change. In a step 520, a content to be displayed can be determined in the display section 410.

In parallel thereto, in a step 525, the monitoring section 420 can be determined in the first image 405. A content of the monitoring section 420 can be analyzed in a step 530, for example, to determine whether a brightness, a coloration, or a contrast each correspond to predetermined values. In a step 530, one or more display parameters can be determined.

On the basis of the at least one display parameter and the content to be displayed, the display 140 can be actuated in a step 540 in order to provide the second image 410. A feedback of the displayed second image 410 into the first image 405 can take place in a step 545, in that the second image 410 is coupled by means of the optical element 135 into the scanning area 160 of the camera 125. A first delay between the actuation of the display 140 and the provision of a corresponding second image 410 and a second delay between the acquisition of the output second image 410 as part of the first image 404 and the provision of a new first image 405 can be taken into consideration or modeled in step 545.

List of Reference Numerals 100 system
105 vehicle
110 driver station
115 driver
120 head area
125 camera
130 processing unit
135 optical element
140 graphic display
145 windshield
150 side window
155 connecting line
160 scanning area
165 further optical element
205 pane
305 mirror
310 projection surface
405 first image
410 second image
415 display section
420 monitoring section
500 method
505 scan environment
510 provide first image
515 determine display section
520 determine content to be displayed
525 determine monitoring section
530 analyze display
535 determine display parameters
540 actuate display
545 feedback by reflection

The invention claimed is:

1. A display system for a vehicle, comprising:
a camera having a predetermined scanning area, the camera configured to scan a first image from an environment of the vehicle;
a processing unit configured to provide a second image on the basis of the first image;
a graphic display configured to display the second image; and
a first optical element configured to insert the display into the scanning area of the camera such that a section of the first image comprises the second image;
wherein the processing unit is configured to provide the second image as a function of the insertion.

2. The display system according to claim 1, wherein the processing unit is further configured to provide the second image where the insertion in the first image has at least one of a predetermined brightness or a predetermined contrast.

3. The display system according to claim 1, wherein:
the scanning area is directed to the rear from the camera; and
the first element is located on the vehicle behind the camera and behind the second image.

4. The display system according to claim 1, wherein the vehicle has a transparent pane and the first optical element is attached to the pane.

5. The display system according to claim 1, wherein:
the vehicle further comprises a driver station configured such that a head of a driver on the driver station is located in a predetermined head area; and
the display is configured to provide the second image in the area of a connecting line between the head area and the camera.

6. The display system according to claim 1, further comprising:
a second optical element attached to the camera that is configured to insert the first optical element into the scanning area.

7. The display system according to claim 1, wherein:
the display is further configured to project the second image; and
the display system further comprises a second optical element attached in the beam path of the display, the second optical element configured to decouple the second image.

8. A vehicle comprising a display system according to claim 1.

9. A method for controlling a display system according to claim 1, wherein the method comprises:
providing a first image by means of the camera;
determining a monitoring section in the first image, the monitoring section representing the second image; and
providing the second image as a function of the monitoring section.

10. The method according to claim 9, wherein:
the first image is disjointedly divided into the monitoring section and a display section; and
the second image is only provided on the basis of the display section.

11. The method according to claim 9, wherein a time delay between a change of the second image and a change of the monitoring section is taken into consideration.

* * * * *